Sept. 25, 1945. A. S. FEINBERG Re. 22,675

AIR CONDITIONING APPARATUS

Original Filed May 18, 1942 2 Sheets-Sheet 1

INVENTOR.
Archie S. Feinberg
BY
Alexander Rodowell
ATTORNEYS

Sept. 25, 1945. A. S. FEINBERG Re. 22,675

AIR CONDITIONING APPARATUS

Original Filed May 18, 1942 · 2 Sheets-Sheet 2

INVENTOR.
Archie S. Feinberg

BY

Hermann Nagel
ATTORNEYS

Reissued Sept. 25, 1945

Re. 22,675

UNITED STATES PATENT OFFICE 22,675

AIR CONDITIONING APPARATUS

Archie S. Feinberg, Dallas, Tex.

Original No. 2,319,119, dated May 11, 1943, Serial No. 443,389, May 18, 1942. Application for reissue May 10, 1945, Serial No. 592,939

9 Claims. (Cl. 261—30)

This invention relates to air washing and cooling apparatus, commonly known to the art as air conditioning apparatus and it refers particularly to certain new and useful improvements on such apparatus.

The principal object of the invention is to provide certain improvements on the applicant's machine as described in his co-pending application, Serial No. 415,171, in which a plurality of evaporator or filter pads are arranged in a housing at a plurality of relative angles whereby to increase the effective area thereof without the necessity of correspondingly increasing the size of the cabinet or housing.

The present invention includes among its outstanding objects the provision of means to effect distribution of moisture over a wider area of the filter pads than has been found possible with the means for a similar purpose set up in the machine described in said co-pending application and whereby the percentage of required saturation of the pads is increased approximately three-fold, thereby insuring effectiveness approaching the maximum.

Another object of the invention is to provide in an apparatus of the kind specified, a pair of baffles in close contiguity to the angularly related pads so that they will receive and uniformly distribute water along the upper portions thereof in sufficient quantities to thoroughly saturate the same and to insure complete effectiveness of the water, the frames of the pads are so fabricated as to allow the discharge edges of the baffles to lie inwardly of the common surfaces of the pads proper.

Still another object of the invention is to provide, through the novel arrangement of baffles, as described, a spray device common to all of the filter pads, that is to say, a single water spray which serves the pad assembly, keeping them thoroughly saturated through the aid of the baffles.

Yet another object of the invention is to provide a novel form of spray device consisting of a motor actuated disc of such design and construction that, when rapidly rotated, will discharge streams of liquid directed against its rear face radially, said streams being deflected by air current through the apparatus in the direction of its axis, which is a desirable characteristic in view of the peculiar positioning of a pair of side filter pads whose walls are disposed at slight angles relative to the path of air induced into the machine by its blower. Hence the desired inclination of the spray discharge is toward the said pads.

A still further object of the invention is to increase the effectiveness of the spray disc by providing a plurality of spray heads adapted to impinge water against the rear face of the disc at a variety of points, the purpose being to insure maximum discharge of water upwardly, in the direction of the distributing baffles, to be intercepted and carried thereby toward and along the upper portions of the side filter pads. Simultaneously the spray heads provide that the rear filter pads will be amply supplied with water to effect thorough saturation thereof.

With the foregoing objects as paramount, the invention has further reference to certain features of accomplishment to become manifest as the description proceeds, taken in connection with the accompanying drawings wherein.

Figure 1:
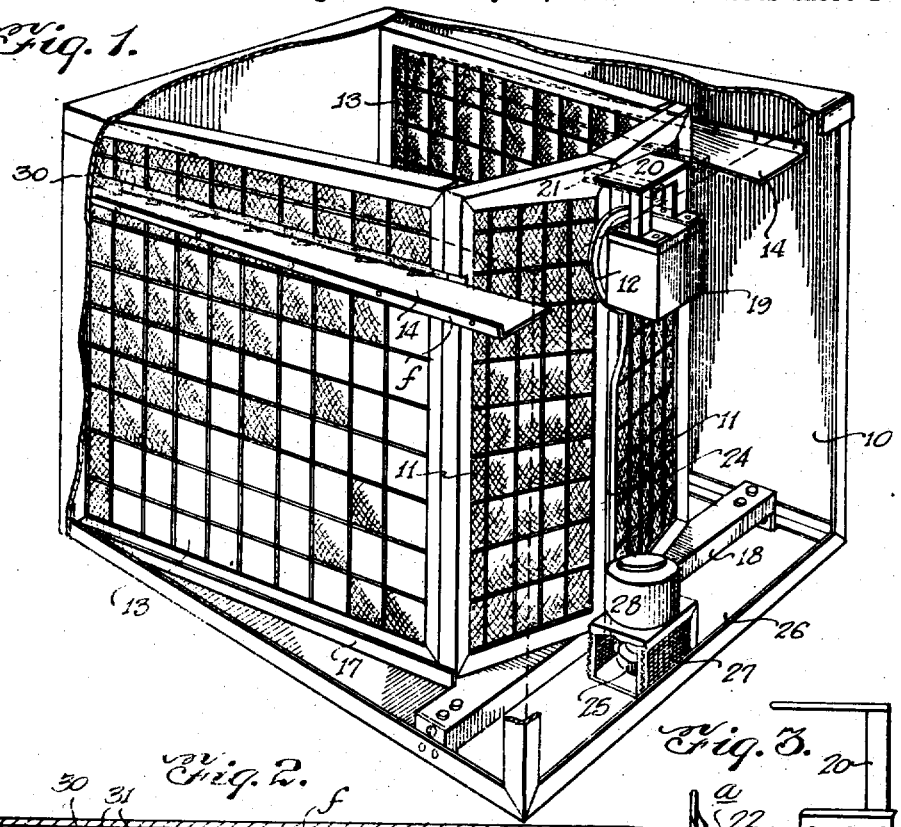
Figure 1 is a perspective view of an air conditioning machine constructed according to the present invention.

Continuing with a more detailed description of the drawings, reference is primarily made to Figure 1 wherein 10 denotes the cabinet or housing which is a rear view and is of more or less conventional design. Ordinarily, machines for a similar purpose contain but a single filter pad which is water saturated and through which air is drawn by a suitable blower fan to cleanse and cool the same. The present invention, as well as that described in the co-pending application, provides a plurality of such pads disposed at a plurality of angles in the cabinet, the present showing of the pads differing from that of the said application only in that two pads 11 are herein provided for and which are also at relative angles, instead of a single rear pad as previously described. The provision of two rear pads is not compulsory as is clearly apparent but inasmuch as it has been and will be hereinafter shown that the objects of the present improvement are to so control the spray of water that it will always tend to move forward; it is obvious that the inclination of the walls of the rear pads 11 will promote this tendency. There are at least four factors which prominently serve in the allocation of the discharge of the spray disc 12. These are, first: the peculiar construction of the disc. Second: the divergent walls of the rearmost pads 11 which reduce the sharpness of the angle around which the water must be conveyed toward the side pads 13. Third: the triangular baffles 14 which intercept the water thrown outwardly and upwardly by the disc 12 and convey the same for distribution along the upper portions of the side baffles 13, and fourth: the action of the air itself when induced by the blower fan 15 to enter the open rear of the machine, as indicated by the arrows, to be discharged through the opening 16 at the front of the cabinet. With all of these factors operating to insure maximum saturation of the pads, combined with the increased area afforded by the multiple pad arrangement, a most efficient and satisfactory air cooling apparatus is provided.

As a support for the pads, channel members 17 provide skids for the side pads 13 while the cross member 18 jointly supports the rear pads 11. Both, the rear pads 11 and the side pads 13 are independently removable for replacement, repair or cleaning, as the case may be.

Figure 4:
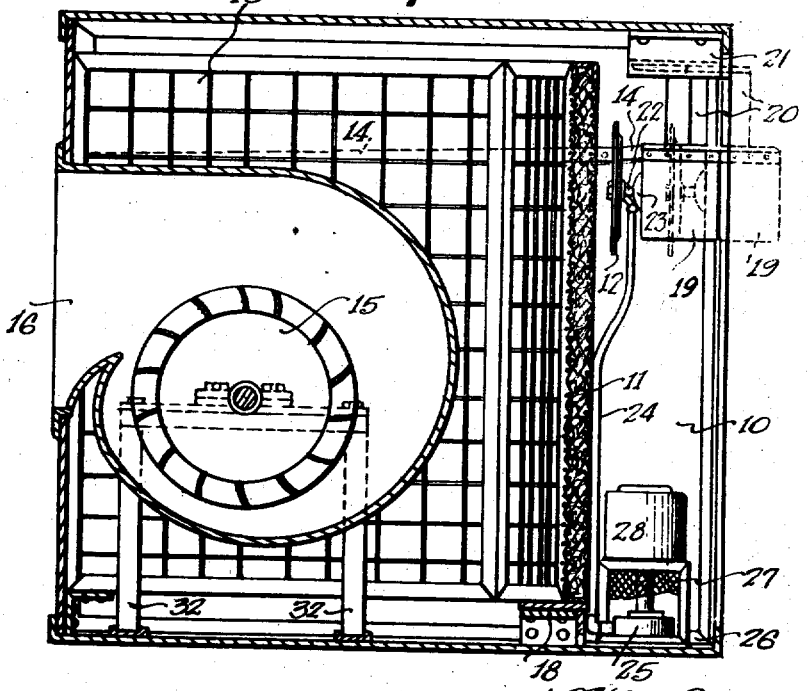
Figure 4 is a side elevational view of the machine in vertical section.

Referring now to the spraying device, it is to be noted that the motor for rotating the disc 12 is mounted in the water-proof housing 19, suspended by means of a bracket 20 which is slidably received in channels 21 affixed to the underside of the top of the cabinet 10. By referring to Figure 4, it will become at once apparent that the motor-housing bracket is mounted by sliding the same into the channels 21. Other forms of mounting the motor and spray disc may, of course, be adopted.

The disc 12 is mounted on the motor armature shaft 22 to lie between the housing 19 and rear pads 11. A moisture shield 23 embraces the opening in the housing 19 through which the shaft 22 passes to prohibit entrance of moisture likely to impair the motor.

Figure 6:
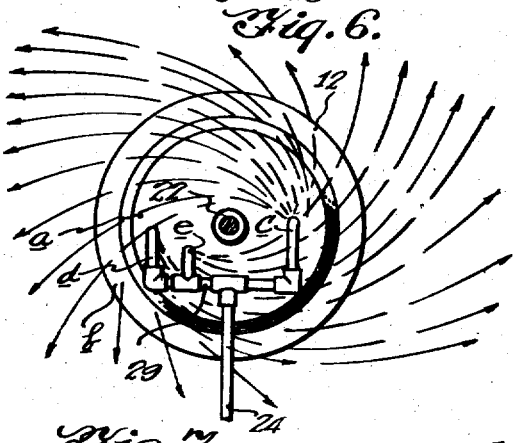
Figure 6 is a rear view of the spray disc, illustrating generally by arrows the direction taken by the water as it is thrown by the disc.
Figure 7:
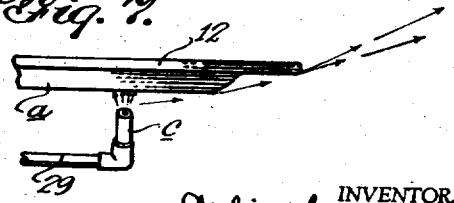
Figure 7 is a fragmentary plan view of the disc and one of the spray heads, designed to show the angle of discharge in the direction of the axis of the disc.

The disc 12 is so constructed as to provide a circular central elevation *a* and a perimetrical flange b (Figures 6 and 7). To the rear of the disc is a system of spray heads mounted on a pipe 24, rising from the pump 25 in the basin 26 and provided with a strainer screen 27. A motor 28 operates the pump.

The spray heads are comprised of a cross-head 29 having a length of pipe *c* at one end (Figure 6) and a shorter pipe *d* at the other, each being directed toward the rear face of the disc, as shown and slightly upward. Intermediate the heads *c* and *d* is yet a shorter head *e*. The purpose of these three heads is to insure a greater discharge of water from the disc 12 upwardly and at substantially right angles outwardly, toward the triangular baffle 14 on either side, which receive the major portion of the water thus discharged and convey the same forwardly along the outer faces of the side pads 13. The spray head *c* is located above the axis of the disc due to the fact that the discharge thereof has a shorter distance to travel on the disc than that of the heads *d* and *e* before it is propelled off the edge thereof. The spray head *d* is so oriented on the disc as to insure sufficient supply of water for the rearmost pads 11 and its discharge is augmented by the smaller head *e* so that a sufficient quantity of water will break through any interference set up by the discharge of spray head *c* and reach the proper point on the disc for projection toward the baffle 13 at the right in Figure 1.

In Figure 7 it will be noted that the shape of the elevated center *a* of the disc, as it merges into the flange *b* causes the film of water thereon under the action of the air currents through the apparatus to thrust forwardly in the direction desired, that is, at an angle toward the axis of the disc. In other words, the discharge of the disc is concaved in the direction of the pads.

Figure 5:
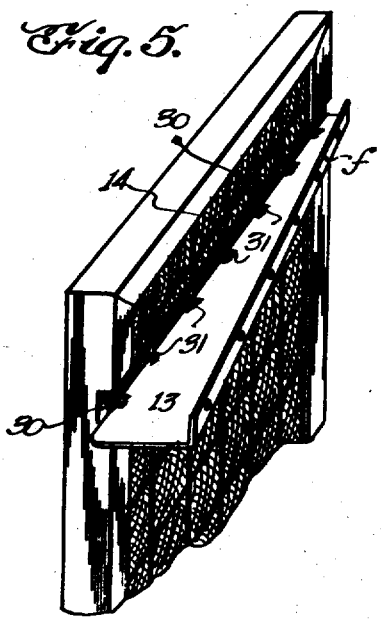
Figure 5 is a fragmentary perspective view of one of the side baffles showing the relationship therewith of the complementary side baffle.

Referring again to the triangular baffles 14, Figure 5 shows the relationship of this baffle with one of the side pads 14. This baffle is required to be triangular in order to conform to the space between the pad and wall of the cabinet 10. The baffle has a flange *f* which is welded, bolted or otherwise secured to the inner wall of the cabinet. The baffles are very slightly inclined toward the rear of the cabinet so that the water collected by the extended ends of the baffles will be conveyed toward the front of the cabinet. There has been some difficulty in the past in properly distributing the water so that the side pads will be sufficiently saturated. This difficulty is overcome by the baffles 13 and further, by so constructing the pads and their frames that a channel 30 is formed from the front to the rear thereof to receive the discharge edges of the baffles, as shown. These discharge edges are provided with spaced triangular notches 31 so as to avoid the formation of a dam along this edge and to insure equal distribution of water overflow throughout the lengths of the baffles.

It is apparent from Figure 5 particularly that since the discharge edge of the baffle 13 extends inwardly of the common face of the pad, the water leaving the baffle will precipitate downward through the fibrous material of the pad instead of along the outer face and depending upon the suction of the fan for pulling the moisture into the pad. Of course, good results are possible by placing the discharge edges of the baffles 13 against the faces of the pads with channeling the latter but superior results are found to be possible by arranging the pads and baffles in the manner shown.

Figure 2:
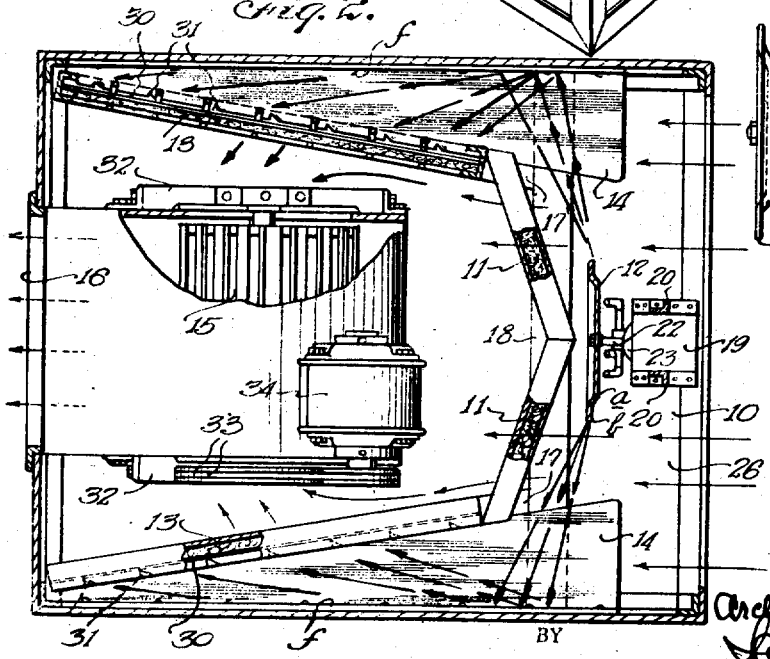
Figure 2 is a plan view with the top removed and portions broken away.
Figure 3:
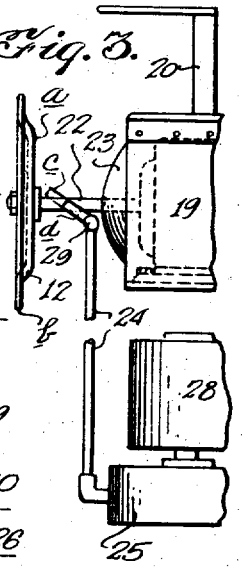
Figure 3 is a side elevational view of the spray disc, with the drive motor, pump, and pump motor shown fragmentarily.

The blower fan 15 is of conventional design, mounted upon the supporting frame 32 and driven through belts 33 by motor 34, Figure 2.

Manifestly, the construction as shown and described is capable of some modification and such modification as may be construed to fall within the scope and meaning of the appended claims is also considered to be within the spirit and intent of the invention.

What is claimed is:

1. An evaporative cooler and humidifier including a cabinet having a rear air intake and a front air outlet, means to effect movement of air therethrough, an assembly of filter pads in said cabinet arranged at a variety of angles in the air stream, means disposed behind the rearmost pad assembly and above the midsection thereof for discharging water radially, said water under influence of the air stream being diverted forwardly toward said pad assembly into the rearmost pads of said assembly, baffles disposed on a substantially horizontal plane, whose discharge edges are contiguous with the upper portions of the exterior walls of the side pads of the assembly and which are adapted to intercept and convey and distribute a portion of the discharge of said water discharging means onto said side pads.

2. An evaporative cooler and humidifier including a cabinet having a blower therein creating a draft therethrough, an assembly of filter pads disposed at a variety of relative angles in said cabinet and through which air is constrained to pass, a substantially horizontal baffle in attendance to each side pad of the assembly, each having an edge in contiguous relation to the outer face thereof and means rearwardly of and common to all of the pads of the assembly for discharging water radially, said water under influence of the draft of air being diverted forwardly in the direction of said pad assembly, a portion of which discharge is intercepted, conveyed and distributed by said baffles along the upper portions of said side pads.

3. An evaporator and cooling unit including a cabinet, a fan and a filter pad assembly arranged therein to define an air space in said cabinet on either side and rearwardly of said assembly, a baffle conforming to the space on either side of said assembly in the upper portion thereof, the discharge edges of said baffles being in contiguous relation to the outer surfaces of the side pads of said assembly, a disc operatively disposed above the mid-section of the rearmost mats, means for impinging streams of water against the rear face of said disc to be thrown thereby radially outward, said water under influence of the draft of air being diverted forwardly towards said pad assembly whereby a portion thereof will be intercepted, conveyed and distributed by said baffles along the upper portions of said side pads.

4. An evaporative cooler and humidifier including a cabinet having a filter pad assembly therein, positioned to define an air space on either side and rearwardly of said assembly, a fan disposed inside of said assembly to constrain air to pass therethrough, a baffle conforming to the space intermediate the walls of said cabinet and the side baffles of said assembly and whose inner edges are in contiguous relation to the outer surfaces of said side pads, and means common to all of the pads of said assembly for discharging water radially, said water under influence of the draft of air being diverted forwardly to moisten the rearmost pads of said assembly and to propel water onto said baffles to be conveyed thereby for distribution along the upper portions of said side mats.

5. Apparatus of the character described comprising a cabinet, a fan in said cabinet, a filter pad assembly arranged about said fan to define a space on either side and rearwardly of said pad assembly and through which air is constrained to pass, a disc suspended for rotation above the mid-section of the rearmost pad of the assembly, means for rotating said disc, a pump, means for conveying water from said pump and discharging same against the rear face of said disc for radial discharge thereof, said water under influence of the draft of air being diverted forwardly to moisten the rearmost pads of the assembly, and means conforming to the space on either side of said pad assembly and in contiguous relation to the side pads thereof for intercepting a portion of the discharge of said disc and conveying the same for distribution along the upper portion of the side pads of said assembly.

6. An air cooling apparatus including a cabinet and a plurality of pervious mats therein, a centrifugal liquid spray device situated above the midsection of the foremast of said mats, the said mats being arranged at a series of relative angles to define forwardly divergent moisture receiving air chambers between the mat assembly and the side walls of said cabinet, and means in contiguous relation with each of the side mats of the assembly to collect and distribute a portion of the discharge of said spray device whereby said spray device will maintain moistened condition of said mats collectively.

7. An evaporative cooler and humidifier including an air pervious filter whose effective area is divided into a central and a pair of side sections, all of which sections are on a vertical plane and disposed at different relative angles, a common means located above the midsection of said central section for maintaining moistened condition of said section means collecting portions of the discharge of said latter means for distribution along the surfaces of said side sections and means for constraining air to pass through said filter sections.

8. An evaporative cooler and humidifier including an air pervious filter in vertical sections whose side sections are divergent from the intermediate portion thereof to define effective side air chambers, means disposed above the center of the intermediate position of said filter for maintaining moistened condition of said filter, means collecting and depositing portions of the discharge of said moistening means on the surfaces of said side sections and means to effect forced movement of air through said filter which means is likewise effective to draw moisture into said chambers and to distribute moisture over the effective area of said filter.

9. An evaporative cooler and humidifier including a pervious filter having a central and relatively divergent side sections defining effective air chambers on the sides of said filter, means to effect forced movement of air through said filter, means disposed forwardly and above the middle of the central portion of said filter and in the current of air moving into said filter for producing a substantially circular spray of water and whereby a part of said spray will be influenced by said air current to enter the said air and moisture receiving chambers for passage through said filter and means alongside the side sections of said filter for receiving and distributing portions of the discharge of said spray means thereon.

ARCHIE S. FEINBERG.